United States Patent
Otake et al.

(10) Patent No.: US 11,370,869 B2
(45) Date of Patent: Jun. 28, 2022

(54) ULTRAVIOLET CURABLE SILICONE COMPOSITION FOR STEREOLITHOGRAPHY AND CURED PRODUCT OF SAME

(71) Applicant: SHIN-ETSU CHEMICAL CO., LTD., Tokyo (JP)

(72) Inventors: Kohei Otake, Annaka (JP); Nobuaki Matsumoto, Annaka (JP); Taichi Kitagawa, Annaka (JP); Toshiyuki Ozai, Annaka (JP); Atsushi Yaginuma, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/265,025

(22) PCT Filed: Jul. 11, 2019

(86) PCT No.: PCT/JP2019/027490
§ 371 (c)(1),
(2) Date: Feb. 1, 2021

(87) PCT Pub. No.: WO2020/026748
PCT Pub. Date: Feb. 6, 2020

(65) Prior Publication Data
US 2021/0309782 A1 Oct. 7, 2021

(30) Foreign Application Priority Data
Aug. 2, 2018 (JP) .............................. JP2018-145905

(51) Int. Cl.
C08F 290/14 (2006.01)
B33Y 70/00 (2020.01)
(Continued)

(52) U.S. Cl.
CPC ........ *C08F 290/148* (2013.01); *B29C 64/112* (2017.08); *B33Y 70/00* (2014.12); *C08F 2/50* (2013.01)

(58) Field of Classification Search
CPC ....... C08F 2/50; C08F 290/06; C08F 290/068
See application file for complete search history.

(56) References Cited

U.S. PATENT DOCUMENTS

| 2008/0076882 A1 | 3/2008 | Ozai |
| 2011/0196096 A1 | 8/2011 | Angermaier et al. |

(Continued)

FOREIGN PATENT DOCUMENTS

| JP | 2006-2087 A | 1/2006 |
| JP | 2007-214543 A | 8/2007 |
| JP | 2008-74982 A | 4/2008 |
| JP | 2012-506933 A | 3/2012 |
| JP | 2012-111226 A | 6/2012 |
| JP | 2014-1341 A | 1/2014 |
| JP | 2016-108458 A | 6/2016 |
| JP | 2016-190977 A | 11/2016 |
| JP | 2016-191001 A | 11/2016 |
| JP | 2016190977 A | * 11/2016 |
| JP | 2019-85488 A | 6/2019 |
| JP | 2019-85489 A | 6/2019 |
| WO | WO 2018/003381 A1 | 1/2018 |

OTHER PUBLICATIONS

International Search Report issued in PCT/JP2019/027490 (PCT/ISA/210), dated Oct. 8, 2019.
(Continued)

*Primary Examiner* — Mark S Kaucher
(74) *Attorney, Agent, or Firm* — Birch, Stewart, Kolasch & Birch, LLP

(57) ABSTRACT

According to the present invention, an ultraviolet curable silicone composition for stereolithography, which contains (A) an organopolysiloxane that has two groups represented by formula (1)

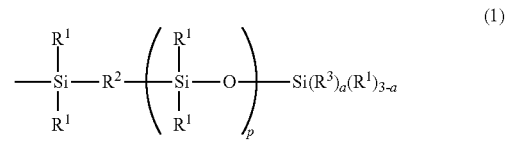

(wherein each $R^1$ independently represents a monovalent hydrocarbon group having 1-20 carbon atoms; $R^2$ represents an oxygen atom or the like; $R^3$ represents an acryloyloxyalkyl group or the like; p represents a number satisfying $0 \leq p \leq 10$; and a represents a number satisfying $1 \leq a \leq 3$) in each molecule,
(B) an organopolysiloxane resin that is composed of (a) a unit represented by formula (2)

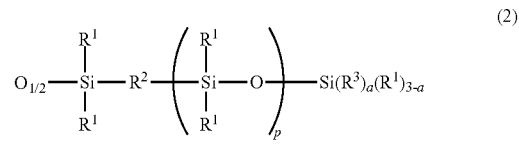

(wherein $R^1$-$R^3$, a and p are as defined above), (b) an $R^4{}_3SiO_{1/2}$ unit (wherein each $R^4$ independently represents a monovalent hydrocarbon group having 1-10 carbon atoms) and (c) an $SiO_{4/2}$ unit, and wherein the molar ratio of the total of the unit (a) and the unit (b) to the unit (c) is within the range of 0.6-1.2:1 and
(C) a photopolymerization initiator has a viscosity that is applicable to a stereolithography system such as lifting system and forms a cured product which has excellent physical properties of rubber.

10 Claims, No Drawings

(51) Int. Cl.
*B29C 64/112* (2017.01)
*C08F 2/50* (2006.01)

(56) References Cited

U.S. PATENT DOCUMENTS

2013/0234370 A1 9/2013 Suzuki et al.
2019/0233670 A1 8/2019 Matsumoto et al.

OTHER PUBLICATIONS

Written Opinion of the International Searching Authority issued in PCT/JP2019/027490 (PCT/ISA/237), dated Oct. 8, 2019.

* cited by examiner

ULTRAVIOLET CURABLE SILICONE COMPOSITION FOR STEREOLITHOGRAPHY AND CURED PRODUCT OF SAME

TECHNICAL FIELD

The present invention relates to an ultraviolet-curable silicone composition for stereolithography and to a cured product thereof.

BACKGROUND ART

With the ongoing growth in 3D printer technology, stereolithography materials for 3D printers are also being actively developed. The stereolithography materials that are widely distributed on the market today are generally acrylic resin compositions or urethane-acrylic resin compositions (Patent Document 1).

However, the great majority of these resin compositions give a hard cured product when irradiated with ultraviolet light, and so a widespread desire exists for ultraviolet-curable compositions that yield rubbery cured products such as silicone rubber. Silicone resins, because they have a high durability compared with general organic resins such as acrylate resins, are expected to see increased use in a broad range of stereolithographic applications.

Silicone compositions containing a light-activated platinum catalyst (Patent Document 2) and silicone compositions that cure by way of a thiol-ene reaction (Patent Document 3) are already being developed as silicone compositions applicable to stereolithographic systems.

Yet, in the case of bottom-up 3D printers, the stereolithography material used must have a low viscosity; the foregoing materials are unsuitable for this purpose. Hence, these exists a desire for the development of a silicone material which has a low viscosity and also exhibits good rubber properties after ultraviolet curing.

PRIOR ART DOCUMENTS

Patent Documents

Patent Document 1: JP-A 2012-111226
Patent Document 2: JP-A 2012-506933
Patent Document 3: JP-A 2006-2087

SUMMARY OF INVENTION

Technical Problem

In view of the above circumstances, one object of this invention is to provide an ultraviolet-curable silicone composition which has a viscosity suitable for use in stereolithography systems such as a bottom-up system and gives a cured product having excellent rubber properties. Another object is to provide such a cured product.

Solution to Problem

The inventors have conducted extensive investigations aimed at achieving these objects and have found as a result that by using a specific organopolysiloxane having (meth) acryloyloxy-containing groups and a given organopolysiloxane resin having (meth)acryloyloxy-containing groups, an ultraviolet-curable silicone composition that has a viscosity suitable for use in stereolithography systems and gives a cured product having good rubber properties can be obtained. This discovery ultimately led to the present invention.

Accordingly, the present invention provides:

1. An ultraviolet-curable silicone composition for stereolithography which includes:

(A) 100 parts by weight of an organopolysiloxane having two groups of formula (1) below per molecule

[Chem. 1]

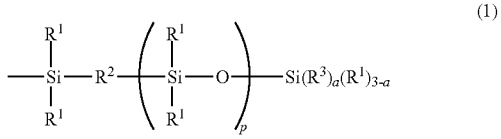

(wherein each $R^1$ is independently a monovalent hydrocarbon group of 1 to 20 carbon atoms, $R^2$ is an oxygen atom or an alkylene group of 1 to 20 carbon atoms, each $R^3$ is independently an acryloyloxyalkyl group, methacryloyloxyalkyl groups, acryloyloxyalkyloxy group or methacryloyloxyalkyloxy group, "p" is a number that satisfies $0 \leq p \leq 10$, and "a" is a number that satisfies $1 \leq a \leq 3$);

(B) from 5 to 200 parts by weight of an organopolysiloxane resin consisting of (a) units of formula (2) below

[Chem. 2]

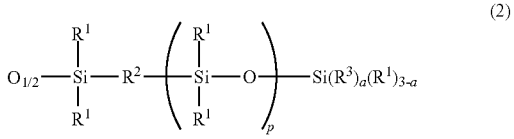

(wherein $R^1$, $R^2$, $R^3$, "a" and "p" are as defined above), (b) $R^4_3SiO_{1/2}$ units (wherein each $R^4$ is independently a monovalent hydrocarbon group of 1 to 10 carbon atoms) and (c) $SiO_{4/2}$ units, the molar ratio of the sum of (a) units and (b) units to (c) units being in the range of 0.6:1 to 1.2:1; and (C) from 0.01 to 20 parts by weight of a photopolymerization initiator;

2. The ultraviolet-curable silicone composition for stereolithography of 1 above which has a viscosity at 23° C. of not more than 10,000 mPa·s;

3. The ultraviolet-curable silicone composition for stereolithography of 1 or 2 above, further including (D) from 0.01 to 20 parts by weight of an ultraviolet absorber having a light absorption at wavelengths of 360 to 410 nm;

4. The ultraviolet-curable silicone composition for stereolithography of any of 1 to 3 above, further including (E) from 0.01 to 20 parts by weight of a colorant; and 5. A cured product of the ultraviolet-curable silicone composition for stereolithography of any of 1 to 4 above.

Advantageous Effects of Invention

The ultraviolet-curable silicone composition for stereolithography of the invention has a viscosity suitable for use in stereolithography systems such as a bottom-up system. Also, the cured product obtained after ultraviolet curing exhibits good rubber properties.

DESCRIPTION OF EMBODIMENTS

The present invention is described in detail below.

The ultraviolet-curable silicone composition for stereolithography according to the invention is characterized by including:

(A) 100 parts by weight of an organopolysiloxane having two groups of formula (1) below per molecule, (B) from 5 to 200 parts by weight of an organopolysiloxane resin consisting of (a) units of formula (2) below, (b) $R^4{}_3SiO_{1/2}$ units (wherein each $R^4$ is independently a monovalent hydrocarbon group of 1 to 10 carbon atoms) and (c) $SiO_{4/2}$ units, the molar ratio of the sum of (a) units and (b) units to (c) units being in the range of 0.6:1 to 1.2:1; and (C) from 0.01 to 20 parts by weight of a photopolymerization initiator.

(A) Organopolysiloxane

Component (A) used in the present invention is one of the crosslinking ingredients in this composition. It is an organopolysiloxane which has two groups of formula (1) below per molecule and in which the backbone is substantially composed of diorganosiloxane units.

[Chem. 3]

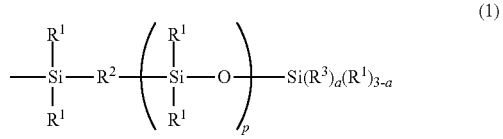

(1)

In formula (1), each $R^1$ is independently a monovalent hydrocarbon group of 1 to 20 carbon atoms, and is preferably a monovalent hydrocarbon group of 1 to 10 carbon atoms, and more preferably 1 to 8 carbon atoms, other than an aliphatic unsaturated group. $R^2$ is an oxygen atom or an alkylene group of 1 to 20 carbon atoms, preferably 1 to 10 carbon atoms, and more preferably 1 to 5 carbon atoms. Each $R^3$ is independently an acryloyloxyalkyl, methacryloyloxyalkyl, acryloyloxyalkyloxy or methacryloyloxyalkyloxy group. Also, "p" is a number that satisfies the condition $0 \le p \le 10$, and "a" is a number that satisfies the condition $1 \le a \le 3$.

In formula (1), the monovalent hydrocarbon groups of 1 to 20 carbon atoms serving as the $R^1$ groups may be linear, branched or cyclic. Specific examples include alkyl groups such as methyl, ethyl, n-propyl, isopropyl, n-butyl, isobutyl, tert-butyl, n-hexyl, cyclohexyl, n-octyl, 2-ethylhexyl and n-decyl groups; alkenyl groups such as vinyl, allyl (2-propenyl), 1-propenyl, isopropenyl and butenyl groups; aryl groups such as phenyl, tolyl, xylyl and naphthyl groups; and aralkyl groups such as benzyl, phenylethyl and phenylpropyl groups.

Some or all of the hydrogen atoms bonded to carbon atoms on these monovalent hydrocarbon groups may be replaced with other substituents. Specific examples include halogen-substituted hydrocarbon groups and cyano-substituted hydrocarbon groups such as chloromethyl, bromoethyl, trifluoropropyl and cyanoethyl groups.

Of these, $R^1$ is preferably an alkyl group of 1 to 5 carbon atoms or a phenyl group; and is more preferably a methyl, ethyl or phenyl group.

The alkylene group of 1 to 20 carbon atoms serving as the $R^2$ group may be linear, branched or cyclic. Specific examples include methylene, ethylene, propylene, trimethylene, tetramethylene, isobutylene, pentamethylene, hexamethylene, heptamethylene, octamethylene, nonamethylene and decylene groups.

Of these, $R^2$ is preferably an oxygen atom or a methylene, ethylene or trimethylene group. An oxygen atom or an ethylene group is more preferred.

The number of carbons in the alkyl (alkylene) group within the acryloyloxyalkyl, methacryloyloxyalkyl, acryloyloxyalkyloxy or methacryloyloxyalkyloxy group represented by $R^3$, although not particularly limited, is preferably from 1 to 10, and more preferably from 1 to 5. Specific examples of these alkyl groups include those, among the groups mentioned above as examples of $R^1$, which have from 1 to 10 carbon atoms.

Specific examples of $R^3$ include, but are not limited to, those of the following formulas.

[Chem. 4]

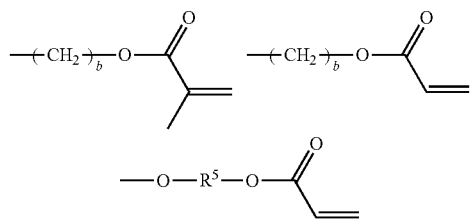

(wherein "b" is a number which satisfies the condition 1 b 4, and $R^5$ is an alkylene group of 1 to 10 carbon atoms)

The subscript "p" is a number that satisfies the condition $0 \le p \le 10$, and is preferably 0 or 1. The subscript "a" is a number that satisfies the condition $1 \le a \le 3$, and is preferably 1 or 2.

The bonding positions of the groups of above general formula (1) in the organopolysiloxane molecule of component (A) used in the invention may be the ends of the molecular chain or non-ends of the molecular chain (i.e., partway along the molecular chain or side chains on the molecular chain), or may be both, although the presence of these groups only at the ends is desirable from the standpoint of flexibility.

In the organopolysiloxane molecule of component (A), organic groups bonded to silicon atoms other than in the groups of above general formula (1) are exemplified by the same groups as $R^1$ above. In particular, monovalent hydrocarbon groups of 1 to 12 carbon atoms, especially 1 to 10 carbon atoms, other than aliphatic unsaturated groups are preferred.

Specific examples include groups like those mentioned above as examples of $R^1$. However, from the standpoint of ease of synthesis, an alkyl, aryl or halogenated alkyl group is preferred, with a methyl, phenyl or trifluoropropyl group being more preferred.

The molecular structure of component (A) is basically a linear or branched chain-like structure (including linear structures in which a portion of the backbone has branches) wherein the backbone is made up of repeating diorganosiloxane units. A linear diorganopolysiloxane in which both ends of the molecular chain are capped with groups of general formula (1) above is preferred.

Component (A) may be a single polymer having these molecular structures, a copolymer made up of these molecular structures, or a mixture of two or more of these polymers.

The organopolysiloxane of component (A) has a viscosity at 25° C. which, from the standpoint of the viscosity of the composition and to further enhance the mechanical properties of the cured product thereof, is preferably from 10 to 100,000 mPa·s, and more preferably from 50 to 50,000 mPa·s. This viscosity range is generally, in the case of a linear organopolysiloxane, one that corresponds to a number-average degree of polymerization of from about 10 to about 550, and preferably from about 50 to about 450. In this invention, the viscosity can be measured with a rotational viscometer, such as a BL, BH, BS or cone/plate-type viscometer or a rheometer (the same applies below).

The degree of polymerization (or the molecular weight) can be determined as the polystyrene-equivalent number-average degree of polymerization (or number-average molecular weight) in gel permeation chromatography (GPC) using toluene or the like as the developing solvent (the same applies below).

Specific examples of the organopolysiloxane of component (A) include, but are not limited to, those of formulas (3) to (5) below.

The organopolysiloxane of formula (4) can be obtained as the product of a hydrosilylation reaction between a dimethylsiloxane/diphenylsiloxane copolymer capped at both ends with dimethylvinylsiloxy groups and 3-(1,1,3,3-tetramethyldisiloxanyl)propyl methacrylate (CAS No. 96474-12-3).

The organopolysiloxane of formula (5) above can be obtained by reacting 2-hydroxyethyl acrylate with the product of a hydrosilylation reaction between a dimethylsiloxane/diphenylsiloxane copolymer capped at both ends with dimethylvinylsiloxy groups and dichloromethylsilane.

(B) Organopolysiloxane Resin

Component (B) is one of the crosslinking ingredients in this composition. It is a (meth)acryloyloxy-containing group-containing organopolysiloxane resin consisting of (a) units of formula (2) below (A units), $R^4_3SiO_{1/2}$ units (M units) and (c) $SiO_{4/2}$ units (Q units).

Specific examples of the monovalent hydrocarbon group of 1 to 10 carbon atoms represented by $R^4$ include, of the groups mentioned above as examples of $R^1$, those having

[Chem. 5]

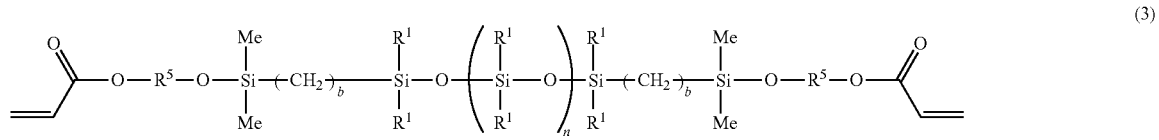

(3)

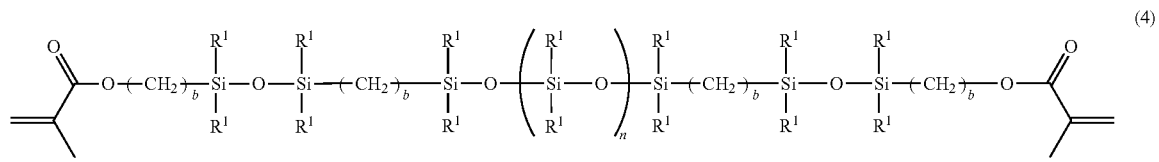

(4)

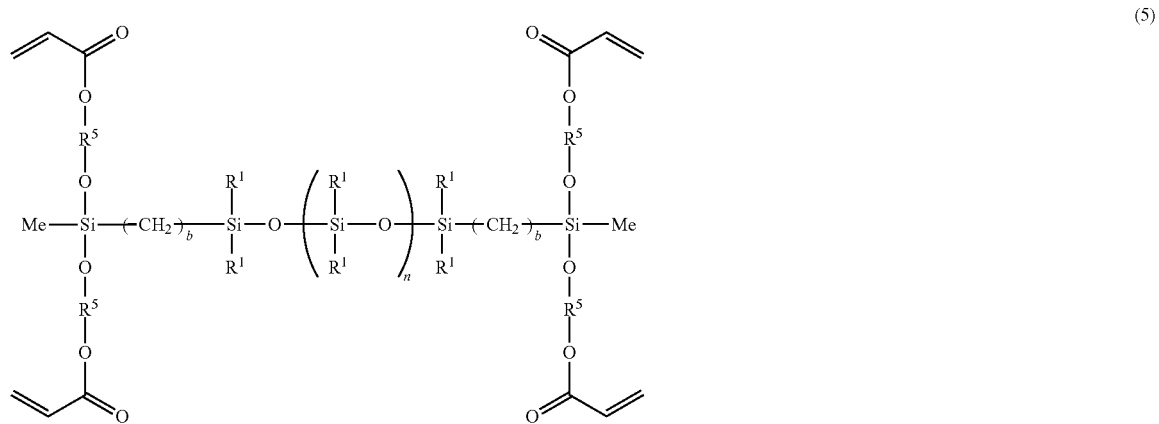

(5)

(wherein $R^1$, $R^5$ and "b" are as defined above, and "n" is a number that sets the viscosity of the organopolysiloxane to the above-indicated value, preferably from 1 to 800, and more preferably from 50 to 600).

Such organopolysiloxanes may be prepared by a known method. For example, the polysiloxane of above formula (3) can be obtained by reacting 2-hydroxyethyl acrylate with the product of a hydrosilylation reaction between a dimethylsiloxane/diphenylsiloxane copolymer capped at both ends with dimethylvinylsiloxy groups and chlorodimethylsilane.

from 1 to 10 carbon atoms, among which the following are preferred: alkyl groups of 1 to 6 carbon atoms, such as methyl, ethyl, n-propyl and n-butyl groups; aryl groups of 6 to 10 carbon atoms such as phenyl and tolyl groups; aralkyl groups of 7 to 10 carbon atoms such as the benzyl group; and alkenyl groups of 2 to 6 carbon atoms such as vinyl, allyl and butenyl groups.

Moreover, as with the $R^1$ groups, some or all of the hydrogen atoms bonded to carbon atoms on the monovalent hydrocarbon groups of $R^4$ above may be replaced with the other substituents mentioned above.

[Chem. 6]

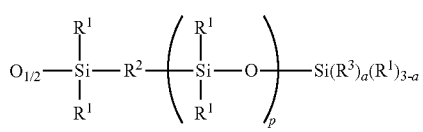

(2)

(In formula (2), $R^1$, $R^2$, $R^3$, "a" and "p" are as defined above.)

In component (B) of the invention, the molar ratio of (a) units of general formula (2) above (A units), (b) $R^4{}_3SiO_{1/2}$ units (M units) and (c) $SiO_{4/2}$ units (Q units), expressed as (A units+M units):Q units, is from 0.6:1 to 1.2:1. When the molar ratio of A units+M units is less than 0.6, the viscosity of the composition may become very high; when it exceeds 1.2, the rubber properties of the cured product may decrease.

In order to set the viscosity of the composition and the rubber properties of the cured product in more suitable ranges, the molar ratio between A units+M units and Q units is preferably (A units+M units):Q units=0.7:1 to 1.2:1.

The rubber properties of the cured product can be adjusted by way of the molar ratio of A units and M units. When there are too many A units, the flexibility of the material may be lost; when there are too few A units, the strength of the material may decrease. Therefore, taking these facts into account, it is preferable for the molar ratio A units:M units to be from 0.25:1 to 0.025:1.

In the inventive composition, the organopolysiloxane resin is added in an amount per 100 parts by weight of component (A) which is in the range of 5 to 200 parts by weight, and preferably 10 to 100 parts by weight. At less than 5 parts by weight, the mechanical properties of the cured product becomes low; at more than 200 parts by weight, the viscosity becomes very high.

(C) Photopolymerization Initiator

Specific examples of photopolymerization initiators that may be used in this invention include 2,2-diethoxyacetophenone, 2,2-dimethoxy-1,2-diphenylethan-1-one (Irgacure 651, from BASF), 1-hydroxycyclohexyl phenyl ketone (Irgacure 184, from BASF), 2-hydroxy-2-methyl-1-phenylpropan-1-one (Irgacure 1173, from BASF), 2-hydroxy-1-{4-[4-(2-hydroxy-2-methylpropionyl)benzyl]phenyl}-2-methylpropan-1-one (Irgacure 127, from BASF), phenyl glyoxylic acid methyl ester (Irgacure MBF, from BASF), 2-methyl-1-[4-(methylthio)phenyl]-2-morpholinopropan-1-one (Irgacure 907, from BASF), 2-benzyl-2-dimethylamino-1-(4-morpholinophenyl)-1-butanone (Irgacure 369, from BASF), phenylbis(2,4,6-trimethylbenzoyl)phosphine oxide (Irgacure 819, from BASF) and diphenyl(2,4,6-trimethylbenzoyl)phosphine oxide (Irgacure TPO, from BASF). These may be used singly or two or more may be used in combination.

Of these, from the standpoint of compatibility with component (A) and component (B), 2,2-diethoxyacetophenone, 2-hydroxy-2-methyl-1-phenylpropan-1-one (Irgacure 1173, from BASF), phenylbis(2,4,6-trimethylbenzoyl)phosphine oxide (Irgacure 819, from BASF) and diphenyl(2,4,6-trimethylbenzoyl)phosphine oxide (Irgacure TPO, from BASF) are preferred.

The photopolymerization initiator is added in an amount within the range of 0.01 to 20 parts by weight per 100 parts by weight of component (A). At less than 0.01 part by weight, the curability is inadequate; when added in an amount greater than 20 parts by weight, the deep curability worsens.

(D) Ultraviolet Absorber Having Light Absorption at 360 nm to 410 nm

An ultraviolet absorber having a light absorption at wavelengths of 360 nm to 410 nm may be added to the composition of the invention in order to adjust the curability during stereolithography with a 3D printer.

Specific examples of ultraviolet absorbers that may be used in this invention include 3-(2H-benzotriazol-2-yl)-5-(1,1-dimethylethyl)-4-hydroxy-$C_{7-9}$ branched and linear alkyl esters of benzenepropanoic acid (Tinuvin 384-2, from BASF), 2-(5-chloro-2-benzotriazolyl)-6-tert-butyl-p-cresol (Tinuvin 326, from BASF), the reaction product of 2-(4,6-bis(2,4-dimethylphenyl)-1,3,5-triazin-2-yl)-5-hydroxyphenyl with [($C_{10-16}$, primarily $C_{12-13}$, alkyloxy)methyl]oxirane (Tinuvin 400, from BASF), thioxanthone, 2-isopropylthioxanthone, 2,4-diethylthioxanthone, benzophenone, camphorquinone, 1-phenyl-1,2-propanedione, diethylamino hydroxybenzoyl hexyl benzoate (Uvinul A Plus, from BASF), 1-(4-tert-butylphenyl)-3-(4-methoxyphenyl)-1,3-propanedione and 2-ethylhexyl 4-methoxycinnamate. These may be used singly, or two or more may be used in combination.

When an ultraviolet absorber is used, the amount of addition per 100 parts by weight of component (A) is preferably in the range of 0.01 to 20 parts by weight. At less than 0.1 part by weight, the effects of the ultraviolet absorber may not fully appear; when more than 20 parts by weight is added, the deep curability may worsen.

(E) Colorant

Various colorants may be added to the inventive composition for such purposes as to adjust the curability of the composition and to colorize the composition.

Colorants that may be used include common pigments (e.g., iron oxide, titanium oxide, zinc oxide) and dyes, carbon black, etc. These may be used singly or two or more may be used in combination.

When a colorant is used, the amount added per 100 parts by weight of component (A) is preferably in the range of 0.01 to 20 parts by weight. At less than 0.01 part by weight, the effects of the colorant may not fully appear; when more than 20 parts by weight is added, the deep curability may worsen.

In addition, additives such as silane coupling agents, tackifiers, polymerization inhibitors, antioxidants, ultraviolet absorbers that are light-resistant stabilizers, and light stabilizers may be included in the inventive composition within ranges which do not detract from the advantageous effects of the invention.

The inventive composition may be suitably mixed with another resin composition and used.

The ultraviolet-curable silicone pressure-sensitive adhesive composition for stereolithography of the invention can be obtained by mixing together in any order above components (A) to (C) and, optionally, other ingredients, and stirring, etc. The apparatus used for operations such as stirring is not particularly limited. For example, an automated mortar, three-roll mill, ball mill, planetary mill or the like may be used. These apparatuses may also be suitably combined.

From the standpoint of the ability to stereolithographically print objects by, for example, the bottom-up approach, the ultraviolet-curable silicone pressure-sensitive adhesive composition for stereolithography of the invention has a viscosity which is preferably not more than 10,000 mPa·s, and more preferably not more than 5,000 mPa·s. At more than 10,000 mPa·s, the printing ability may markedly worsen and it may be impossible to accurately obtain the printed object that is desired.

The ultraviolet-curable silicone pressure-sensitive adhesive composition for stereolithography of the invention rapidly cures under ultraviolet irradiation.

Exemplary sources of the ultraviolet light that is irradiated in this case include UV LED lamps, high-pressure mercury-vapor lamps, ultrahigh-pressure mercury-vapor lamps, metal halide lamps, carbon arc lamps and xenon lamps.

[Chem. 7]

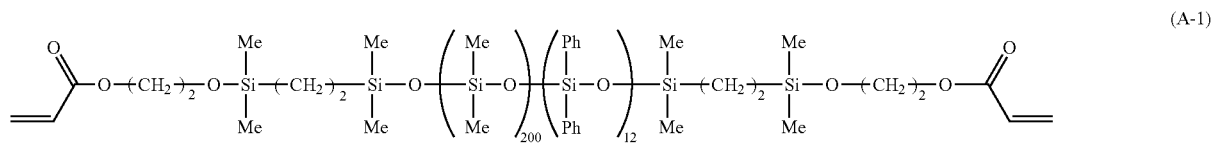
(A-1)

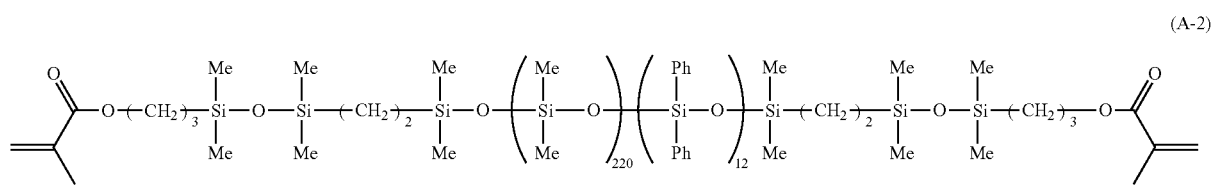
(A-2)

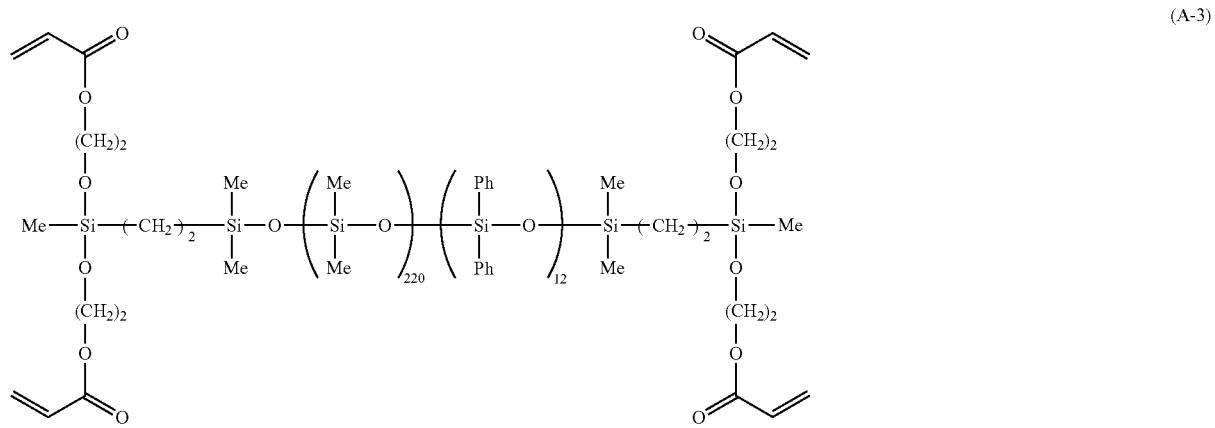
(A-3)

The amount of ultraviolet irradiation (cumulative exposure dose) with respect to, for example, a sheet of the inventive composition formed to a thickness of about 2.0 mm, is preferably from 1 to 10,000 mJ/cm$^2$, and more preferably from 10 to 6,000 mJ/cm$^2$. That is, when ultraviolet light at an illuminance of 100 mW/cm$^2$ is used, the ultraviolet light may be irradiated for a period of from about 0.01 second to about 100 seconds.

For a cured product composed of the ultraviolet-curable silicone pressure-sensitive adhesive composition for stereolithography of the invention to exhibit excellent rubber properties, the tensile strength is preferably at least 0.5 MPa, and more preferably at least 0.8 MPa. Also, the elongation at break is preferably at least 30%, and more preferably at least 50%. These values are measured values obtained in accordance with JIS-K6249.

EXAMPLES

Examples and Comparative Examples are given below to more concretely illustrate the invention, although the invention is not limited by these Examples.

The compounds serving as the ingredients used in the Examples were as follows. Here, "Me" stands for a methyl group. "Ph" stands for a phenyl group and "Vi" stands for a vinyl group.

Component (A):

(wherein the siloxane units within parentheses may be arranged in any order)

Component (B):
(B-1) 50 wt % xylene solution of organopolysiloxane resin (number-average molecular weight, 5,700) containing the methacryloyloxy group-containing unit shown below, ViMe$_2$SiO$_{1/2}$ units, Me$_3$SiO$_{1/2}$ units and SiO$_2$ units in a molar ratio, expressed as methacryloyloxy group-containing units/(ViMe$_2$SiO$_{1/2}$ units)/(Me$_3$SiO$_{1/2}$ units)/(SiO$_2$ units), of 0.07/0.10/0.67/1.00

(B-2) 50 wt % xylene solution of organopolysiloxane resin (number-average molecular weight, 6,200) containing the methacryloyloxy group-containing unit shown below, ViMe$_2$SiO$_{1/2}$ units, Me$_3$SiO$_{1/2}$ units and SiO$_2$ units in a molar ratio, expressed as methacryloyloxy group-containing units/(ViMe$_2$SiO$_{1/2}$ units)/(Me$_3$SiO$_{1/2}$ units)/(SiO$_2$ units), of 0.14/0.03/0.67/1.00

[Chem. 8]

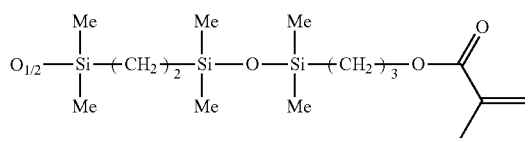

(Comparative Ingredient)
(B-3) 50 wt % xylene solution of organopolysiloxane resin (number-average molecular weight, 5,300) containing ViMe$_2$SiO$_{1/2}$ units, Me$_3$SiO$_{1/2}$ units and SiO$_2$ units in a molar ratio, expressed as (ViMe$_2$SiO$_{1/2}$ units)/(Me$_3$SiO$_{1/2}$ units)/(SiO$_2$ units), of 0.17/0.67/1
Component (C)
(C-1) 2-Hydroxy-2-methyl-1-phenylpropan-1-one (Irgacure 1173, from BASF Japan)
(C-2) Diphenyl(2,4,6-trimethylbenzoyl)phosphine oxide (Irgacure TPO, from BASF Japan)
Component (D)
(D-1) 2-Isopropylthioxanthone (Tokyo Chemical Industry Co., Ltd.)
Component (E)
(E-1) Titanium oxide (Tipaque R-820, from Ishihara Sangyo Kaisha, Ltd.)
(E-2) Carbon black (Denka Black, from Denka Co., Ltd.)

Examples 1 to 7 and Comparative Examples 1 to 3

The respective silicone compositions shown in Table 1 were prepared by mixing together Components (A) to (E) in the proportions shown in Table 1, and then distilling off the xylene at 100° C. under reduced pressure. The viscosities of the compositions in Table 1 are values measured at 23° C. using a rotational viscometer.

The silicone compositions thus prepared were cured in a nitrogen atmosphere and at room temperature (25° C.) by irradiation with 365 nm wavelength ultraviolet light to an exposure dose of 10,000 mJ/cm² using the Eye UV Electronic Controller (model UBX0601-01) from Eye Graphics Co., Ltd. The thickness of the sheet was set to 2.0 mm. The hardness, elongation at break and tensile strength of the cured product were measured in accordance with JIS-K6249.

As shown in Table 1, the ultraviolet-curable silicone pressure-sensitive adhesive compositions prepared in Examples 1 to 7 had viscosities suitable for use in bottom-up and other types of stereolithography systems, in addition to which the resulting cured products had good mechanical properties.

On the other hand, in the compositions in Comparative Examples 1 and 2 that do not include a methacryloyloxy group-containing organopolysiloxane resin, it is apparent that the cured products have a low tensile strength and are brittle materials. The composition in Comparative Example 3 containing excess component B has an exceedingly high viscosity and clearly cannot be used in stereolithography.

The invention claimed is:

1. An ultraviolet-curable silicone composition for stereolithography, comprising:
   (A) 100 parts by weight of an organopolysiloxane having two groups of formula (1) below per molecule

[Chem. 1]

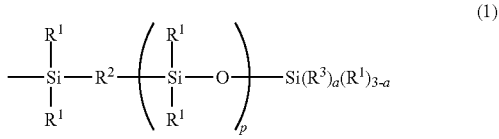

wherein each R$^1$ is independently a monovalent hydrocarbon group of 1 to 20 carbon atoms, R$^2$ is an oxygen atom or an alkylene group of 1 to 20 carbon atoms, each R$^3$ is independently an acryloyloxyalkyl group, methacryloyloxyalkyl groups, acryloyloxyalkyloxy group or methacryloyloxyalkyloxy group, "p" is a number that satisfies 0≤p≤10, and "a" is a number that satisfies 1≤a≤3;

(B) from 5 to 200 parts by weight of an organopolysiloxane resin consisting of (a) units of formula (2) below

TABLE 1

|  |  | Example | | | | | | | Comparative Example | | |
|---|---|---|---|---|---|---|---|---|---|---|---|
|  |  | 1 | 2 | 3 | 4 | 5 | 6 | 7 | 1 | 2 | 3 |
| Formulation (pbw) | A-1 | 100 | 100 |  |  |  |  |  | 100 | 100 | 100 |
|  | A-2 |  |  | 100 |  |  |  |  |  |  |  |
|  | A-3 |  |  |  | 100 | 100 | 100 | 100 |  |  |  |
|  | B-1 | 40 |  |  |  |  |  |  |  |  | 250 |
|  | B-2 |  | 40 | 40 | 40 | 40 | 40 | 40 |  |  |  |
|  | B-3 |  |  |  |  |  |  |  |  | 40 |  |
|  | C-1 | 0.7 | 0.7 | 0.7 | 0.7 | 0.7 | 0.7 | 0.7 | 0.5 | 0.7 | 0.2 |
|  | C-2 | 0.7 | 0.7 | 0.7 | 0.7 | 0.7 | 0.7 | 0.7 | 0.5 | 0.7 | 0.2 |
|  | D-1 |  |  |  |  |  | 0.7 |  |  |  |  |
|  | E-1 |  |  |  |  |  |  | 1.4 |  |  |  |
|  | E-2 |  |  |  |  |  |  | 0.3 |  |  |  |
| Properties of composition | Viscosity (mPa·s) | 1,220 | 1,210 | 1,310 | 1,260 | 1,300 | 1,320 | 1,340 | 1,020 | 1,660 | 62,000 |
| Properties of cured product | Hardness (type A) | 31 | 39 | 41 | 51 | 50 | 52 | 50 | 30 | 7 | 58 |
|  | Tensile strength (MPa) | 1.3 | 1.9 | 2.1 | 5.5 | 4.7 | 4.5 | 4.1 | 0.4 | 0.2 | 3.2 |
|  | Elongation at break (%) | 100 | 110 | 100 | 100 | 100 | 90 | 100 | 70 | 120 | 90 |

[Chem. 2]

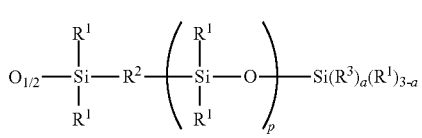
(2)

wherein $R^1$, $R^2$, $R^3$, "a" and "p" are as defined above, (b) $R^4_3SiO_{1/2}$ units, wherein each $R^4$ is independently a monovalent hydrocarbon group of 1 to 10 carbon atoms, and (c) $SiO_{4/2}$ units, wherein (b) comprises $ViMe_2SiO_{1/2}$ units wherein Me represents a methyl group and Vi represents a vinyl group, the molar ratio of the sum of (a) units and (b) units to (c) units being in the range of 0.6:1 to 1.2:1; and (C) from 0.01 to 20 parts by weight of a photopolymerization initiator.

2. The ultraviolet-curable silicone composition for stereolithography of claim 1 which has a viscosity at 23° C. of not more than 10,000 mPa·s.

3. The ultraviolet-curable silicone composition for stereolithography of claim 1, further comprising (D) from 0.01 to 20 parts by weight of an ultraviolet absorber having a light absorption at wavelengths of 360 to 410 nm.

4. The ultraviolet-curable silicone composition for stereolithography of claim 1, further comprising (E) from 0.01 to 20 parts by weight of a colorant.

5. A cured product of the ultraviolet-curable silicone composition for stereolithography of claim 1.

6. The ultraviolet-curable silicone composition for stereolithography of claim 2, further comprising (D) from 0.01 to 20 parts by weight of an ultraviolet absorber having a light absorption at wavelengths of 360 to 410 nm.

7. The ultraviolet-curable silicone composition for stereolithography of claim 2, further comprising (E) from 0.01 to 20 parts by weight of a colorant.

8. An ultraviolet-curable silicone composition for stereolithography, comprising:

(A) 100 parts by weight of an organopolysiloxane having two groups of formula (1) below per molecule

[Chem. 1]

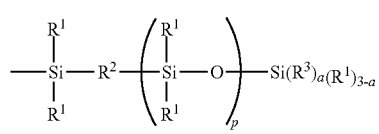
(1)

wherein each $R^1$ is independently a monovalent hydrocarbon group of 1 to 20 carbon atoms, $R^2$ is an oxygen atom or an alkylene group of 1 to 20 carbon atoms, each $R^3$ is independently an acryloyloxyalkyl group, methacryloyloxyalkyl groups, acryloyloxyalkyloxy group or methacryloyloxyalkyloxy group, "p" is a number that satisfies 0≤p≤10, and "a" is a number that satisfies 1≤a≤3;

(B) from 5 to 200 parts by weight of an organopolysiloxane resin consisting of (a) units of formula (2) below

[Chem. 2]

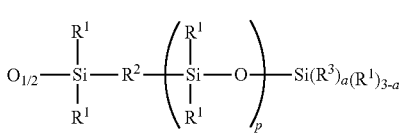
(2)

wherein $R^1$, $R^2$, $R^3$, "a" and "p" are as defined above, (b) $R^4_3SiO_{1/2}$ units, wherein each $R^4$ is independently a monovalent hydrocarbon group of 1 to 10 carbon atoms, and (c) $SiO_{4/2}$ units, the molar ratio of the sum of (a) units and (b) units to (c) units being in the range of 0.6:1 to 1.2:1;

(C) from 0.01 to 20 parts by weight of a photopolymerization initiator; and (D) from 0.01 to 20 parts by weight of an ultraviolet absorber having a light absorption at wavelengths of 360 to 410 nm.

9. An ultraviolet-curable silicone composition for stereolithography, comprising:

(A) 100 parts by weight of an organopolysiloxane having two groups of formula (1) below per molecule

[Chem. 1]

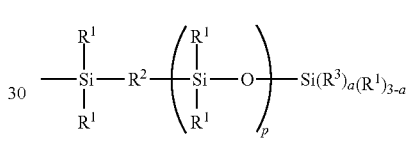
(1)

wherein each $R^1$ is independently a monovalent hydrocarbon group of 1 to 20 carbon atoms, $R^2$ is an oxygen atom or an alkylene group of 1 to 20 carbon atoms, each $R^3$ is independently an acryloyloxyalkyl group, methacryloyloxyalkyl groups, acryloyloxyalkyloxy group or methacryloyloxyalkyloxy group, "p" is a number that satisfies 0≤p≤10, and "a" is a number that satisfies 1≤a≤3;

(B) from 5 to 200 parts by weight of an organopolysiloxane resin consisting of (a) units of formula (2) below

[Chem. 2]

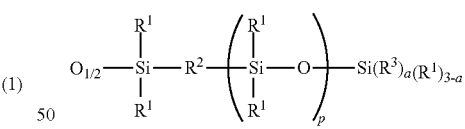
(2)

wherein $R^1$, $R^2$, $R^3$, "a" and "p" are as defined above, (b) $R^4_3SiO_{1/2}$ units, wherein each $R^4$ is independently selected from the group consisting of aryl groups of 6 to 10 carbon atoms, aralkyl groups of 7 to 10 carbon atoms, and alkenyl groups of 2 to 6 carbon atoms, and (c) $SiO_{4/2}$ units, the molar ratio of the sum of (a) units and (b) units to (c) units being in the range of 0.6:1 to 1.2:1; and (C) from 0.01 to 20 parts by weight of a photopolymerization initiator.

10. The ultraviolet-curable silicone composition for stereolithography of claim 1, wherein the molar ratio of (a) units to (b) units is from 0.25:1 to 0.025:1.

* * * * *